March 23, 1943.  C. W. DODDS  2,314,694
ELECTRICAL CONDUCTOR
Filed Jan. 6, 1942
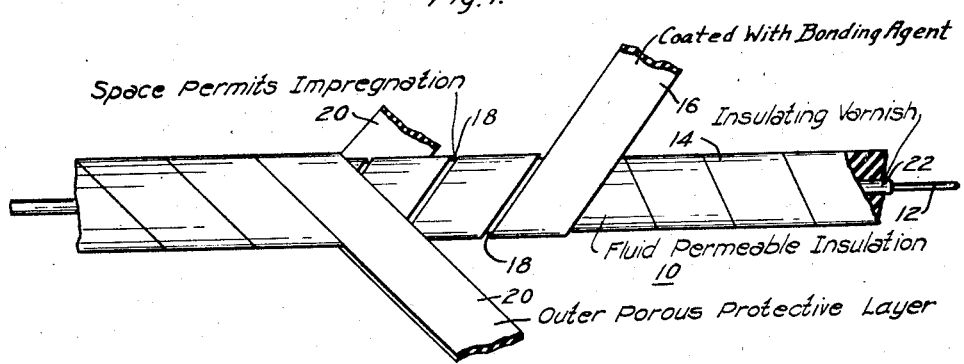
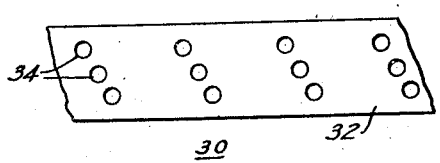
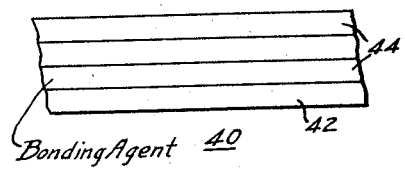
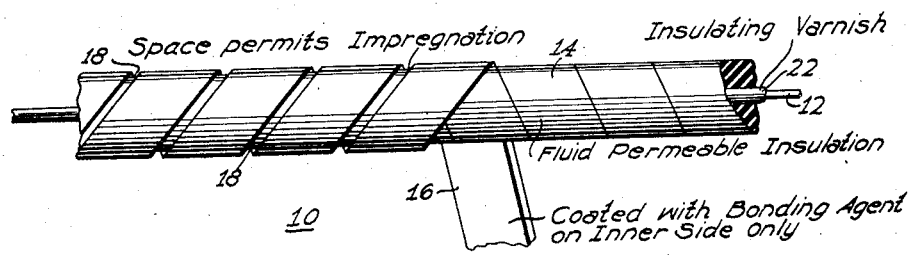
WITNESSES:
INVENTOR
Clarence W. Dodds.
BY
ATTORNEY Patented Mar. 23, 1943

2,314,694

UNITED STATES PATENT OFFICE 2,314,694

ELECTRICAL CONDUCTOR

Clarence W. Dodds, Sharon, Pa., assignor to Westinghouse Electric & Manufacturing Company, East Pittsburgh, Pa., a corporation of Pennsylvania Application January 6, 1942, Serial No. 425,769

10 Claims. (Cl. 174—25)

This invention relates to electrical conductors, more particularly electrical conductors suitable for use when immersed in dielectric liquids.

The object of this invention is to provide for improved electrical insulative properties in insulated conductors to be immersed in dielectric fluids.

A further object of this invention is to provide for an insulative conductor suitable for use in dielectric fluids.

Other objects of the invention will, in part, be obvious and will, in part, appear hereinafter.

For a fuller understanding of the nature and objects of the invention, reference should be had to the following detailed description and the accompanying drawing, in which:

Figure 1 is a fragmentary view partly in section of an insulated conductor.

Fig. 2 is a view in elevation of a portion of a strip of bonding tape,

Fig. 3 is a view in elevation of a modification of the strip shown in Fig. 2, and Fig. 4 is a fragmentary view partly in section of a modified form of the invention.

It is frequently necessary to employ electrically insulated conductors in dielectric liquids such, for example, as refined petroleum oil or chlorinated aromatic hydrocarbons. As heretofore prepared, the conductors carried a wrapping of solid insulation composed of paper, cloth or the equivalent thoroughly saturated and impregnated with resins or insulating compositions. It has been the generally accepted view in the prior art that certain types of insulation for use in dielectric liquids should be impervious to the dielectric liquids to avoid both the solvent action thereof on a large surface area of resin or composition and the possible introduction of contaminating matter. Accordingly, considerable effort was made to thoroughly seal the external surface of electrical conductors for this use by applying the resin or insulating composition impregnation to render the body of the insulation impervious. The impregnation has been accompanied by one undesirable result, namely, the inadvertent trapping of air, moisture or other undesirable gaseous impurity within the solid insulation. In the presence of high voltage, the trapped gases ionized and generated corona and often failure of conductors immersed in fluid dielectrics has been traced to the trapped gaseous matter.

According to this invention, an electrically insulated conductor is prepared with the opposite view in mind. The conductors of this invention are produced with insulation which is substantially porous and open to the penetration and passage of the dielectric liquid to the innermost portions thereof. Air and other gases are not trapped in the insulated conductor so prepared, but are readily released and escape due to displacement by the dielectric liquid. Ionization with its possibility of insulation failure is therefore avoided. The electrical insulating characteristics of the insulation, including the dielectric liquid, on the conductor has been found to be fully as adequate as, and in some cases, even better than that of the prior art conductors. Furthermore, the cost of preparing a conductor according to the present invention is much less than that of conductors prepared with insulation impregnated with insulating resins and the like to seal off any penetration of the dielectric liquid.

Referring to Fig. 1 of the drawing, the insulated conductor 10 there shown comprises a conductor 12 of a suitable conductor metal, such as copper. The conductor 12 is covered with solid insulation 14 which is permeable to the dielectric liquid in which the insulating conductor 10 is to be employed. A common material for this use is manila rope paper. Other dielectric permeable materials such as cotton, glass fibers, asbestos, paper pulp and equivalent or similar materials, may be used. A convenient method of applying the permeable material is in the form of a tape. The insulation 14 if in tape form, may be wrapped on to a predetermined thickness. It will be appreciated that no varnish or bonding agent of any type is applied to or interposed between the applications of permeable insulation 14.

After the insulation 14 has been uniformly and thoroughly applied, a layer of sheet material 16, preferably in tape form, is applied over the insulation 14. The tape 16 is coated with an adhesive or other bonding agent. The purpose of the layer 16 is to bond the insulation 14 to prevent unraveling or loosening with consequent undesirable results.

Inasmuch as the insulative conductors are intended for use in a dielectric liquid, the bonding agent present thereon should be of a type insoluble in the dielectric liquid. It has been discovered that satisfactory results are secured by employing a thermoplastic resin having adhesive characteristics as the bonding agent on the tape 16. For use in oil and other purified petroleum dielectrics suitable thermoplastics are shellac, polyvinyl acetate, polyvinyl acetal, plasticized cellulose ethers and esters. These substances are thermoplastic resins from which varnish-like solutions for application to the paper or both tape 16 may be prepared by dissolving in an appropriate solvent. The varnishes so prepared may be modified by adding sufficient thermosetting resins such as phenolaldehydes to control the softening point within desired temperature limits. When the varnish solution is applied to tape 16, it will dry to produce a non-tacky coated tape at room temperature. When subjected to elevated temperatures, the coated tape becomes adhesive due to the thermoplastic resin coating softening.

The following example is indicative of one method of preparing a tape 16. A pulverized mixture of 40 pounds of polyvinyl acetate and 40 pounds of polyvinyl acetal is dissolved in a solvent mixture comprising approximately 20 gallons of toluol, 14 gallons of alcohol, and 14 gallons of xylol. The solution is best prepared in a heated kettle at temperatures of from 45° C. to 70° C. When the polyvinyl resins have been dissolved, 24 pounds of cresylic acid-formaldehyde in the A stage is added. The solution will contain approximately 25% solvents. A paper tape, for example of manila rope paper, is immersed in the varnish solution, drained, and dried in an oven to remove the solvent. The tape with the resin coating will be found to be non-tacky and dry at room temperature.

In preparing tapes for use in halogenated aromatic hydrocarbon dielectric liquids, dewaxed shellac and plasticized cellulose ester thermoplastic bonding agents have been found to resist the action of the liquids.

Thermoplastic resins have been found to be adaptable as bonding agents for the purpose of the invention and have been used with success. Other oil insoluble adhesives may likewise be applied to the tape 16. For example, polyvinyl alcohol derived by hydrolyzing a polyvinyl ester, such as polyvinyl acetate, to a hydrolysis of 50 to 75% may be applied in a water-ethyl alcohol solvent to a tape and dried. This adhesive also results in a hard dry film when applied to the paper tape 16. The tape is rendered adhesive by applying a wetting medium thereto and bonding under pressure. Heat is not required to produce adhesiveness with polyvinyl alcohol. The usual heat treatment combined with evacuation employed with electrical apparatus (such as transformers) will result in the removal of all of the wetting medium from the conductor. Polyvinyl alcohol is insoluble in both oil and the halogenated hydrocarbon dielectrics.

Preferably the bonding agent is applied to the tape 16 in order to coat both sides of the tape. It has been found that tape coated on both sides with a bonding agent enables satisfactory insulation to be most readily prepared.

The tape 16 with bonding agent is applied over the insulation 14 in such a manner as to produce slight spaces between successive spirals of the tape 16 when the tape is applied as a spiral wrapping. No particular effort need be made to produce the spaces 18 providing care is taken to prevent overlapping of the tape 16. A 64th of an inch distance for the space 18 has been found to be satisfactory. Greater width of spacing will produce equally satisfactory results.

In order to prevent the insulated conductor adhering to adjacent insulated conductors or other structures due to the bonding agent on tape 16 being exposed, the insulated conductor is given an exterior covering consisting of one or more layers of liquid dielectric permeable material 20. Cloth tape is a satisfactory material for this purpose. However, paper, glass fibers, asbestos and other materials are equally suitable.

This exterior covering may be made of material which primarily has mechanical strength, as it serves to protect the insulation beneath it from mechanical abrasion. With this method of bonding, it is possible to obtain resistance to mechanical abrasion comparable to that obtained in the prior art by the use of the more expensive sleeving.

After being wrapped tightly with the tape 20, the entire conductor is placed within an oven, if the bonding agent is a thermoplastic adhesive, and the temperature raised to a point at which the thermoplastic adhesive becomes cementitious. Once this temperature has been reached, the conductor need be maintained at the temperature for only a short period of time. On cooling it will be discovered that the bonding agent on tape 16 has united the exterior cover 20 and the insulation 14 into a tightly held construction. Shellac, vinyl acetate and polyvinyl acetal will be effective for cementation at temperatures of 100° C. to 125° C. It will be appreciated that the exterior wrapping 20 and the tape 16 should be applied with sufficient pressure to insure good bonding when the adhesive becomes cementitious.

When the conductor has been consolidated by heat treatment, it will be found that the provision for dielectric penetration in spaces 18 and the nature of the insulating materials used for 14 and 20 will permit the dielectric liquid to pass through the covering 20, through spaces 18 and to the permeable insulation 14. The dielectric liquid will quickly saturate the insulation. Air, moisture and other deleterious gases will escape. Thereby the effects of corona will be avoided. The dielectric liquid will effect as high grade electrical insulation within the conductor as any varnish filling or impregnation that is known. There is no reduction in the properties of the insulation produced by the conductor shown in Fig. 1 as compared to that of the prior art.

It has been discovered that copper exerts a certain amount of catalytic effect influencing the decomposition of fluid dielectrics in the presence of small quantities of impurities. Accordingly, to avoid the catalytic effect of copper on the dielectric liquid, a thin coating of insulating varnish 22 may be applied to the conductor 12 prior to the application of the insulation 14. If a thermoplastic insulating varnish 22 is applied, this varnish will soften during the heat treatment employed in rendering the bonding agent on the tape 16 cementitious and the insulation 14 will be bonded to the conductor 12 simultaneously therewith.

It is not necessary to apply tapes of the type of tape 16 with controlled wrapping in order to provide spaces between successive spirals for passage of the dielectric fluid. It is possible to prepare a tape of such properties that no matter how wound, adequate provision is made for the penetration therethrough of the dielectric liquid. For example, as shown in Fig. 2, the tape 30 consists of a strip composed of paper, cloth or other suitable sheet material. The strip 32 is perforated at suitable intervals with small apertures 34 of desired shape. These apertures 34 may be spaced together closely or in any configuration depending on the method of winding and applying the tape. The perforated strip 32 is coated with bonding agent consisting of one of the adhesive materials disclosed herein. Alternatively, the strip may be coated before perforation. The tape 30 so prepared may be applied to the insulation 14 with the usual taping machines known to the art. Overlapping the edges of this tape is not harmful.

A further modification of binding tape is shown in Fig. 3. The adhesive tape 40 consists of the paper or fabric base 42 coated with adhesive 44 applied in strips or other pattern that does not cover the entire surfaces of the paper. The oil or other fluid dielectric will readily pass through the uncoated portions of the paper and thereby insure complete saturation of the insulation 14 of the conductor. This type of tape may not be as effective in permitting air to escape if the edges are overlapped as the previous tape modifications.

While the preferred embodiment of the invention employs a tape 16 coated with a bonding agent on both sides thereof, and requires an exterior cover subsequently applied in order to prevent adhesion of the conductor to adjacent conductors, it is feasible to employ a tape coated on one side only with adhesive, the tape being applied with the adhesive placed downward on the insulation 14 as shown in Figure 4. No covering need be used since no bonding agent is exposed. However, the covering 20, particularly if made of a cotton fabric, supplies strengthening characteristics to the total insulation on the conductor. It has been found that the construction shown in Fig. 1 is mechanically better than the construction shown in Figure 4 where only one face of the tape 16 carries adhesive.

The advantages accruing from preparing an insulated conductor without saturating the insulation with organic varnishes and resins and avoiding the necessity of extensive preparation required by such treatment results in marked economies in the preparation of cable for use in fluid dielectrics. In addition, the conductor prepared according to this invention will be found to be less subject to failure due to gas pockets being inadvertently trapped as occurs with the prior art, produces a more satisfactory conductor.

Other features include greater flexibility over impregnated insulation. Furthermore the insulation is easily removable without unraveling when the conductor is being cut or cleaned off.

Since certain obvious changes may be made in the above procedure and different embodiments of the invention could be made without departing from the scope thereof, it is intended that all matter contained in the above description or taken in connection with the accompanying drawing shall be interpreted as illustrative and not in a limiting sense.

I claim as my invention:

1. An electrically insulated conductor suitable for use in dielectric fluids and cooperative therewith for enhanced insulative properties comprising, in combination, an electrical conductor, a dielectric fluid permeable insulation applied to the conductor, a layer of sheet material applied over the fluid permeable insulation, the sheet material carrying a fluid dielectric insoluble bonding agent, the sheet material being so prepared and applied that spaces for penetration by the dielectric fluid to the fluid permeable insulation and for escape of air and other gases are provided, and an outer fluid dielectric permeable covering applied to the sheet material, the whole being united by the bonding agent.

2. An electrically insulated conductor suitable for use in dielectric fluids and cooperative therewith for enhanced insulative properties comprising, in combination, an electrical conductor, a coating of insulating varnish on the conductor, a dielectric fluid permeable insulation applied to the conductor, a layer of sheet material applied over the fluid permeable insulation, the sheet material carrying a fluid dielectric insoluble bonding agent, the sheet material being so prepared and applied that spaces for penetration by the dielectric fluid to the fluid permeable insulation and for escape of air and other gases are provided, and an outer fluid dielectric permeable covering applied to the sheet material, the whole being united by the bonding agent.

3. An electrically insulated conductor suitable for use in dielectric fluids and cooperative therewith for enhanced insulative properties comprising, in combination, an electrical conductor, a dielectric fluid permeable insulation applied to the conductor, the fluid permeable insulation composed of a wrapping of cellulosic material, a layer of sheet material applied over the fluid permeable insulation, the sheet material carrying a fluid dielectric insoluble bonding agent, the sheet material being so prepared and applied that spaces for penetration by the dielectric fluid to the fluid permeable insulation and for escape of air and other gases are provided, and an outer fluid dielectric permeable covering applied to the sheet material, the whole being united by the bonding agent.

4. An electrically insulated conductor suitable for use in dielectric fluids and cooperating therewith for enhanced insulative properties comprising, in combination, an electrical conductor, dielectric fluid permeable insulation applied to the conductor, a layer of material applied over the fluid permeable insulation, the layer of material having a bonding agent insoluble in the dielectric fluid on both sides thereof, the layer of material so prepared and applied as to provide for penetration of dielectric fluid therethrough to the permeable insulation and for escape of air and gases, and an exterior dielectric fluid permeable covering applied upon the layer of material carrying the bonding agent to prevent adhesion of the bonding agent to other members, the exterior covering and the fluid permeable insulation being united to the layer of material by the bonding agent.

5. An electrically insulated conductor suitable for use in dielectric fluids and cooperating therewith for enhanced insulative properties comprising, in combination, an electrical conductor, dielectric fluid permeable insulation applied to the conductor, a layer of material applied over the fluid permeable insulation, the layer of material having a bonding agent insoluble in the dielectric fluid on both sides thereof, the layer of material comprising a tape coated with the bonding agent and applied as a spiral wrapping with open spaces between successive spirals as to provide for penetration of dielectric fluid therethrough to the permeable insulation and for escape of air and gases, and an exterior dielectric fluid permeable covering applied upon the layer of material carrying the bonding agent to prevent adhesion of the bonding agent to other members, the exterior covering and the fluid permeable insulation being united to the layer of material by the bonding agent.

6. An electrically insulated conductor suitable for use in dielectric fluids and cooperating therewith for enhanced insulative properties comprising, in combination, an electrical conductor, dielectric fluid permeable insulation applied to the conductor, a layer of material applied over the fluid permeable insulation, the layer of material having a thermoplastic bonding agent insoluble in the dielectric fluid on both sides thereof, the layer of material so prepared and applied as to provide for penetration of dielectric fluid therethrough to the permeable insulation and for escape of air and gases, and an exterior dielectric fluid permeable covering applied upon the layer of material carrying the thermoplastic bonding agent to prevent adhesion of the bonding agent to other members, the exterior covering and the fluid permeable insulation being united to the layer of material by the thermoplastic bonding agent.

7. An electrically insulated conductor suitable for use in dielectric fluids and cooperating therewith for enhanced insulative properties comprising, in combination, an electrical conductor, dielectric fluid permeable insulation applied to the conductor, a layer of material applied over the fluid permeable insulation, the layer of material having a thermoplastic bonding agent insoluble in the dielectric fluid on both sides thereof, the layer of material so prepared and applied as to provide for penetration of dielectric fluid therethrough to the permeable insulation and for escape of air and gases, and an exterior dielectric fluid permeable covering of cotton tape applied upon the layer of material carrying the thermoplastic bonding agent to prevent adhesion of the bonding agent to other members, the exterior covering of cotton tape and the fluid permeable insulation being united to the layer of material by the thermoplastic bonding agent.

8. The method of producing an electrical conductor suitable for use in dielectric fluids and cooperating with the dielectric fluids for improved insulative properties comprising, in combination, applying dielectric fluid permeable electrical insulation to an electrical conductor, applying sheet material carrying a bonding agent insoluble in the dielectric fluid about the permeable insulation in such manner that spaces are exposed for penetration of dielectric fluid past the sheet material, applying a dielectric fluid permeable exterior covering over and around the sheet material and causing the bonding agent to unite the exterior covering, sheet material and the permeable electrical insulation.

9. The method of producing an electrical conductor suitable for use in dielectric fluids and cooperating with the dielectric fluids for improved insulative properties comprising, in combination, applying dielectric fluid permeable electrical insulation to an electrical conductor, applying sheet material carrying a thermoplastic bonding agent insoluble in the dielectric fluid about the permeable insulation in such manner that spaces are exposed for penetration of dielectric fluid past the sheet material, applying a dielectric fluid permeable exterior covering over and around the sheet material and heating the conductor and the material thereon to cause the thermoplastic bonding agent to unite the exterior covering, sheet material and the permeable electrical insulation.

10. An electrically insulated conductor suitable for use in dielectric fluids and cooperative therewith for enhanced insulative properties comprising, in combination, an electrical conductor, a dielectric fluid permeable insulation applied to the conductor, a layer of sheet material applied over the fluid permeable insulation, the sheet material carrying a fluid dielectric insoluble bonding agent on the side disposed to the fluid permeable insulation only, the sheet material being so prepared and applied that spaces for penetration by the dielectric fluid to the fluid permeable insulation and for escape of air and other gases are provided, the whole being united by the bonding agent.

CLARENCE W. DODDS.